Oct. 11, 1966   H. SIMON   3,278,146
PIPE CLAMP
Filed Nov. 19, 1964
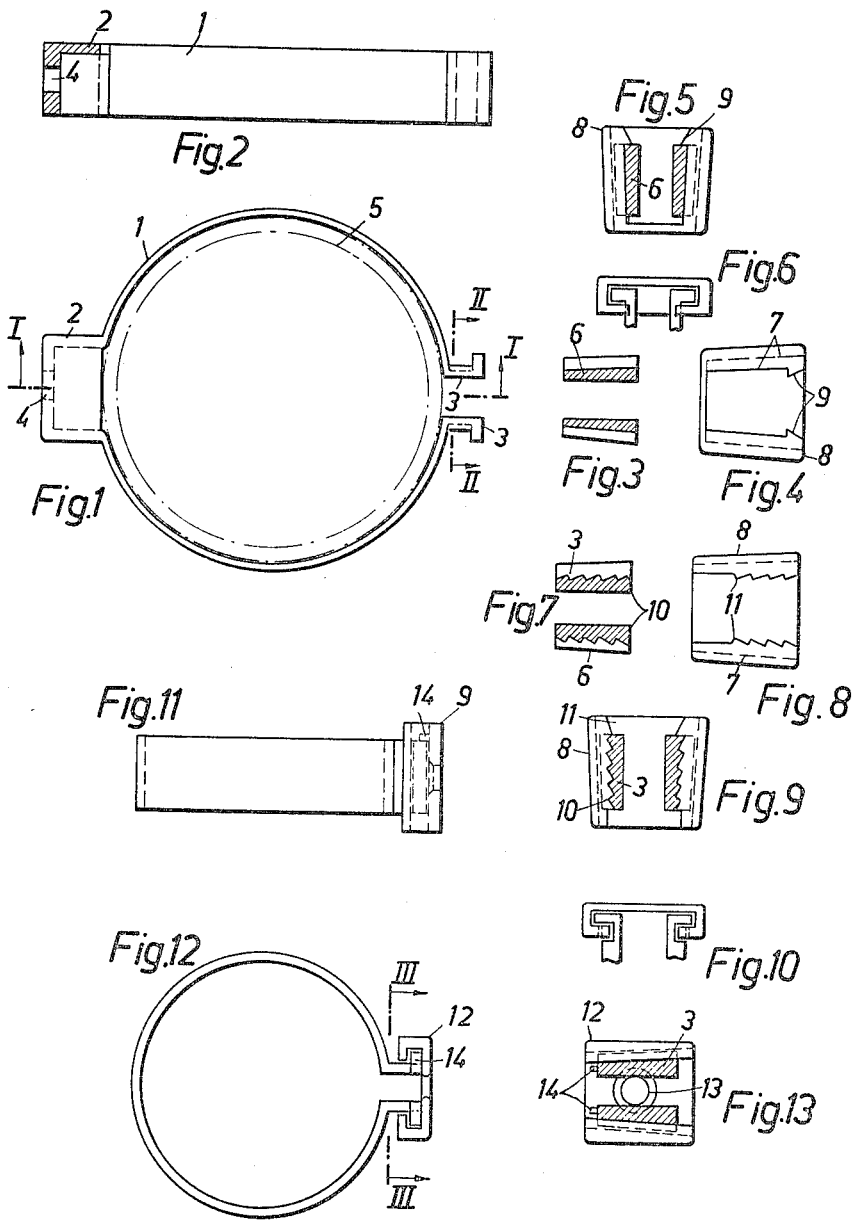
Inventor:
HEINZ SIMON
BY Buchman and Archer
HIS ATTORNEYS

United States Patent Office 3,278,146
Patented Oct. 11, 1966

3,278,146
PIPE CLAMP
Heinz Simon, Huettenstr. 32–34, Kaufbeuren-
Neugablonz, Germany
Filed Nov. 19, 1964, Ser. No. 412,505
Claims priority, application Germany, Nov. 23, 1963,
S 88,403
5 Claims. (Cl. 248—73)

Pipe clips mounted in walls and adapted to hold or retain iron pipelines are known in the art. Generally, these clips comprise two semicircular frames, the frame to be mounted in the wall being equipped with a pointed or barbed anchor. After fitting the pipe, these two frames are bolted together.

The present invention relates to a similar pipe clip, consisting, however, of a synthetic resin and used mainly for fitting plastic pipelines.

However, according to the invention, the clip does not consist of two semi-circular parts adapted to be bolted together, but only of a single round part which is formed with two ends which can be locked together by means of a locking member after the pipe has been fitted. Opposite to the two frame ends to be locked together, this clip has a tangential, reinforced projection having a hole for driving or knocking in the mounting element (such as a nail, screw, dowel or the like).

According to the invention, the clip is fitted at certain intervals to the wall and the pipe is then inserted by bending apart the clip ends, consisting of a tough and resilient material. Then the two clip ends are locked together by means of a slide member, also made from plastic. The correct locking is achieved in that the two clip ends are angled off towards the outside and have the same inclined track as the sliding locking member. The more this locking member is pushed over the frame ends, the more the parts are clamped together. The locking member is pushed from the bottom towards the top over the frame ends to be locked together and is secured against becoming detached by ratchet teeth provided on the top on either side and resting after the fitting of the locking member against the end faces of the frame ends. This safety is given also if the clip is fitted in reversed position, that is rotated through 180°, and the locking member is pushed over from the top. According to a further feature of the invention the locking member may be provided with a plurality of locking teeth engaging into mating teeth provided in the clip ends and securing it against being detached. In this case, the locking member is not closed at the bottom, but open at the top and bottom to enable it to yield or spread better during the engagement into the teeth a the clip ends. Also here, it is fitted from the bottom towards the top, but can also be fitted in the opposite direction, because the engagement is taken up by several teeth and the location is thereby again assured. These clips with single- or multi-tooth locking members are particularly suitable for mounting pipelines under the plaster.

In the following, the invention will be described with reference to a pipe clip for mounting top-mounted pipelines. This clip is again a round, broken clip, forming two ends, but without the lug carrying the mounting hole, because in this case not the clip but the locking member is fixed in the wall. To this end, this locking member is equipped with the hole for fitting the mounting element. After fixing the locking member in the brickwork, the pipe clip is simply pushed over the pipe and both clip ends are locking in the locking member. The clip ends are again formed with inclined insertion faces. For securing, the clip has at the end of its inclined insertion track, i.e., at the bottom, stops preventing the inserted clip ends from falling through the locking member with the pipe. Both clip ends are thus pushed into the locking member from the top.

The clip according to the invention can also be used with large gaps from the wall, because distance pieces may be fitted as required. They guarantee quick and reliable locking, do not restrict axial thrusts and bridge the thermal expansion of the pipes.

The accompanying drawing shows an embodiment of the invention.

FIG. 1 shows the clip with mounting lug and without fitted locking member, viewed from the top;
FIG. 2 is a cross-section along the line I—I in FIG. 1;
FIG. 3 is a cross-section along the line II—II in FIG. 1;
FIG. 4 shows a single-tooth locking member;
FIG. 5 shows the clip ends along the line II—II with fitted locking member;
FIG. 6 is a top view thereof;
FIG. 7 is a cross-section of the clip ends with several teeth;
FIG. 8 shows the associated locking member, also provided with several teeth;
FIG. 9 is a cross-section of the toothed clip ends with fitted locking member;
FIG. 10 is a top view thereof;
FIG. 11 shows the pipe clip without mounting lug, wherein the clip ends are pushed into the locking member mounted in the wall;
FIG. 12 is a top view thereof;
FIG. 13 is a cross-section along the line III—III in FIG. 12.

FIGS. 1 to 6 show a pipe clip 1 with lug 2 and angled clip ends 3. The hole for driving in the mounting means is shown at 4 and the dash-dotted line 5 indicates the pipe. The fitting tracks 6 of the clip ends to be locked are inclined, as well as the tracks 7 of the locking member 8. The locking member 8 is pushed from the bottom over the clip ends 3 until the ratchet teeth 9 on either side engage over the end faces of the clip ends 3, as shown in FIG. 5.

According to the figures points 7 to 10 refer to teeth on the clamp, the clip ends 3 are again equipped with conical faces 6, 7, but both the clip ends 3 and the locking member 8 have more than one tooth 10 and 11, respectively. The locking member is open both on the top and at the bottom to enable it to spread more easily during fitting over the clip ends 3.

First the clip is mounted on the wall and the pipe 5 is inserted. After the fitting of the pipe, the two clip ends are locked together by means of the locking member 8.

FIGS. 11 to 13 show a different type of clip having two clip ends 3, but not provided with the lug 2 and hole 4, because here not the clip but the locking member 12 is fixed to the wall, and has to this end a hole 13. To prevent it from dropping through together with the pipe, the end of the insertion track, i.e., at the bottom, is equipped with locking or stop pins 14. In this case, therefore, the clip ends, having been pushed over the pipe 5, are fitted into the locking member 12, mounted on the wall, from the top and locked therein.

According to a further feature of the invention, not only the wall-mounted locking member 12, but also the locking member 8 are provided with holes for driving in the fixing means so that also these elements can be fixed to the wall if required and the clip ends can be inserted into the locking member 8.

Finally also, the pipe clip can be broken at other points so that the clip ends for locking are diametrically offset in the direction from the horizontal centre line to the vertical centre line. Moreover, the pipe clip may be modified and adapted to the structural requirements, without thereby departing from the principle of the invention.

What I claim is:

1. A pipe clip of synthetic resin for mounting plastic pipes, characterized in that it consists of a circular split ring, means on the ring providing for fastening it to a support, said ring being formed to provide radially directed external clip ends facing each other, said ends having inclined, longitudinally arranged surfaces, a locking member suitable to engage said ends, said locking member also being equipped with matching inclined surfaces, to interlock with the said clip ends.

2. A pipe clip of synthetic resin for mounting plastic pipes as claimed in claim 1, characterized in that the clip ends have external ratchet teeth and the locking member internal ratchet teeth which interengage.

3. A pipe clip in accordance with claim 1, characterized in that the locking member is provided with an end means closing the narrow end and serving as a stop.

4. A pipe clip in accordance with claim 3, characterized in that the stop is formed by two spaced pins integral with the bracket.

5. A pipe clip in accordance with claim 1, characterized in that the locking member is provided with a ratchet tooth on each flange at the broader end thereof, the ratchet tooth gripping axially behind the respective tapered flange arms of the clamp when in locked position.

References Cited by the Examiner

UNITED STATES PATENTS

| | | | |
|---|---|---|---|
| 824,556 | 6/1906 | Lowry et al. | 24—136 |
| 1,148,717 | 8/1915 | Rivers | 24—136 |
| 1,642,243 | 9/1927 | Hinzer | 24—136 |
| 1,787,734 | 1/1931 | Rowling | 248—74 |
| 2,761,714 | 9/1956 | Cuskie | 287—85 |
| 2,790,576 | 4/1957 | Lawrence | 220—42 |
| 2,990,082 | 6/1961 | Boysen | 220—31 |

FOREIGN PATENTS

| | | |
|---|---|---|
| 1,352,534 | 1/1964 | France. |
| 649,165 | 1/1951 | Great Britain. |

CLAUDE A. LE ROY, *Primary Examiner.*